(12) United States Patent
Holt, Jr.

(10) Patent No.: US 6,460,249 B1
(45) Date of Patent: Oct. 8, 2002

(54) METHOD OF CONSTRUCTING A NUT HARVESTING DEVICE

(76) Inventor: Cecil Holt, Jr., 101 E. Sellers St., Douglas, GA (US) 31533

( * ) Notice: Subject to any disclaimer, the term of this patent is extended or adjusted under 35 U.S.C. 154(b) by 0 days.

(21) Appl. No.: 09/886,727

(22) Filed: Jun. 21, 2001

(51) Int. Cl.$^7$ ............................................... B21K 19/00
(52) U.S. Cl. ...................... 29/891; 56/328.1; 294/19.2
(58) Field of Search ........................... 29/891; 56/327.1, 56/328.1; 294/19.2; 414/437, 439, 440

(56) References Cited

U.S. PATENT DOCUMENTS

| | | |
|---|---|---|
| 2,729,046 A | 1/1956 | Patterson |
| 3,068,634 A | 12/1962 | Robinson |
| 3,215,293 A | 11/1965 | Kelly et al. |
| 3,604,190 A | 9/1971 | Wray |
| D323,831 S | * 2/1992 | Hollis ........................ 56/328.1 |

* cited by examiner

Primary Examiner—P. W. Echols
(74) Attorney, Agent, or Firm—Brian D. Bellamy

(57) ABSTRACT

A method of making a nut harvester in which a plurality of wires are formed into a generally oval and cylindrically shaped chamber having flattened end portions. The shape of the chamber is created by forming the ends of wires into a circular configuration, then clamping the ends of the wires between inner and outer sleeves, pressing the wires and creating a deformation near the ends, then inserting a threaded bolt through the inner sleeve and placing a nut on the end of the bolt within said chamber. Tightening the nut on the bolt deforms the wires further to create substantially flat end portions of the chamber and further bowing the central portion of the wires to enlarge the chamber. The chamber is attached to a handle by a bail to provide a nut harvester having a rolling basket chamber that receives the nuts.

3 Claims, 6 Drawing Sheets

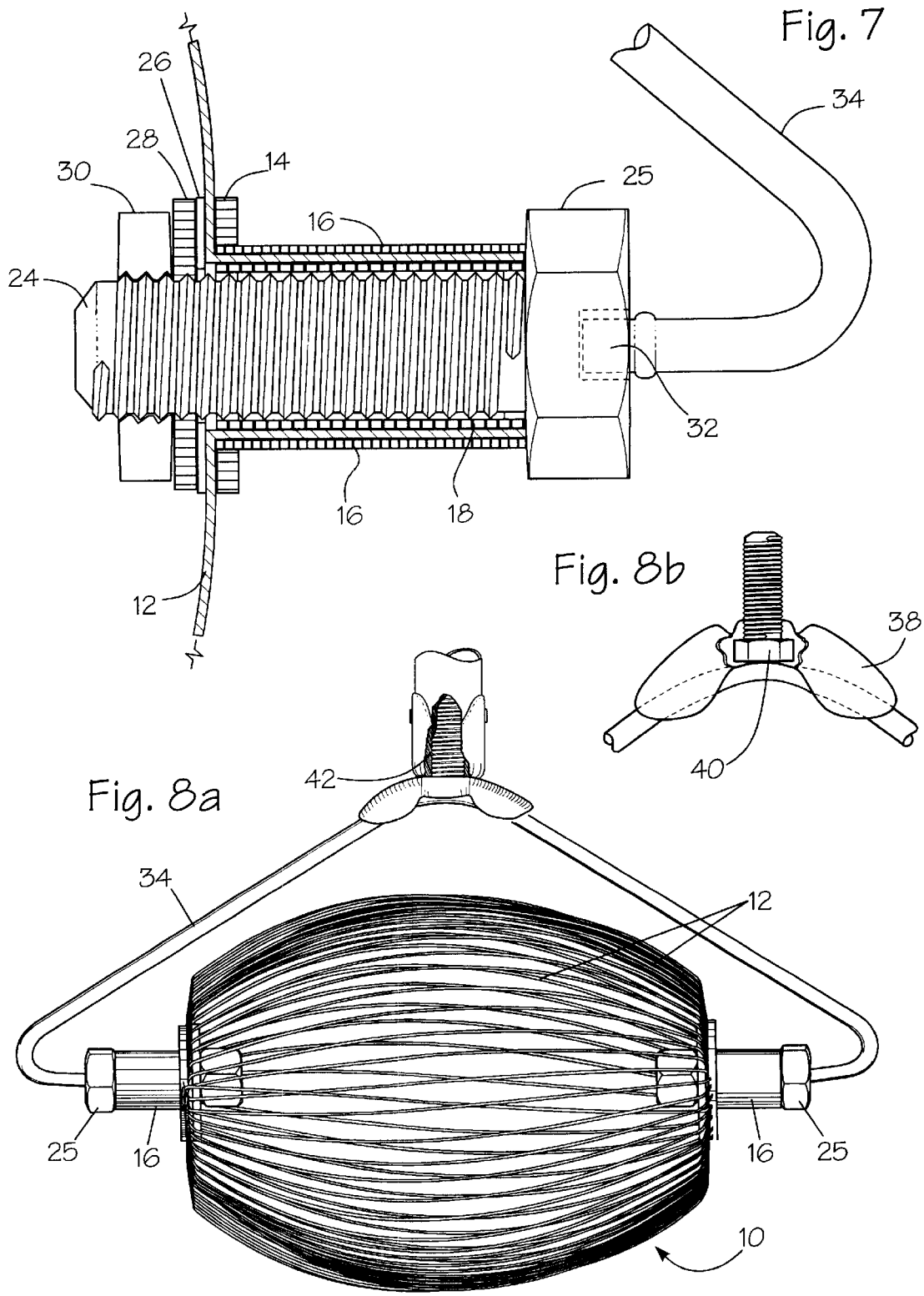

METHOD OF CONSTRUCTING A NUT HARVESTING DEVICE

BACKGROUND OF THE INVENTION

The present invention relates to a method of constructing a rotary nut harvesting device and, particularly to a rotary nut harvesting device constructed having a wire basket for gathering nuts or other generally round objects lying on the ground.

The primary purpose of this invention is to provide those growers with smaller orchards to harvest their crops without having to purchase expensive equipment. It is also well known that hand operated wire baskets are used by persons manually harvesting nuts to bridge the gap between expensive nut harvesting machines and picking up nuts by hand. Such wire baskets are generally mounted to roll on the end of a long handle so that the person harvesting does not need to kneel or stoop over to harvest the nuts. Thus, wire basket nut harvester plays an important role in improving the ergonomics involved in manually harvesting nuts, which is particularly important to our senior citizens who are often employed to gather nuts or the like.

Manually operated harvesters help individuals gather many times the amount of nuts that one could gather without such tools. However, hand operated harvesters of the past have been inefficient and cost prohibitive to manufacture, or, in the alternative, such hand operated harvesters have been of low quality construction or difficult to use efficiently. For example U.S. Pat. No. 3,068,634 to Robinson discloses a popular and reasonably inexpensive method constrict a nut harvester having a basket comprising a longitudinally elongated spring wire spiral. The Robinson device seems to have several positive attributes such as ease of manufacture and low cost of construction. However, the Robinson device is inefficient in use because the device must be constantly lifted to pick up nuts. Other U.S. Pat. Nos. 3,215,293 to Kelly et al and U.S. Pat. Pat. 3.604,190 to Wray teach devices that use a wire basket that rolls along the ground for picking up objects such as nuts. However, these devices include axles within the baskets and other attributes that appear to make them more difficult and expensive to construct.

SUMMARY OF THE INVENTION

The present invention provides a method of manufacturing a nut harvesting device. A plurality of wires of substantially equal, length are provided and arranged substantially parallel with an open ended circular configuration having an outer periphery and an inner periphery. A washer is inserted on each end of the wires about the outer periphery along with an outer sleeve. An inner sleeve is inserted on each end of the wires within the inner periphery by pressing the inner sleeve into the inner periphery of the wires. Inserting the inner sleeve causes the inner sleeve and outer sleeve to impinge against the wires. The wires are then pressed to begin the formation of an oval cylindrical chamber and then further pressed to form deformations near each end of the wires. A bolt is inserted through each of the inner sleeves and bears against the outer sleeve. A nut, metal washer, and rubber washer bearing against the inside of the wires is tightened on each end of the bolts causing the wires to form substantially flat ends of said chamber between the nuts and inner sleeves and outer sleeves. A bail attaches the chamber to a handle for use as a hand-held nut harvester that is effective, yet simple and inexpensive to construct.

DESCRIPTION OF THE DRAWINGS

FIG. 3b is an end elevation view of the step shown in FIG. 3a.

FIG. 7 is a partial front elevational view taken on a section to enlarge in detail the steps in completing the basket as shown in FIG. 6.

FIG. 8a is a partial front elevational view of the basket connected to a handle in accordance with the steps of the present invention.

FIG. 8b is an enlarged front elevational view of the device for attaching the handle to the bail in accordance with the steps of the present invention.

DETAILED DESCRIPTION OF THE INVENTION

Figure 1:
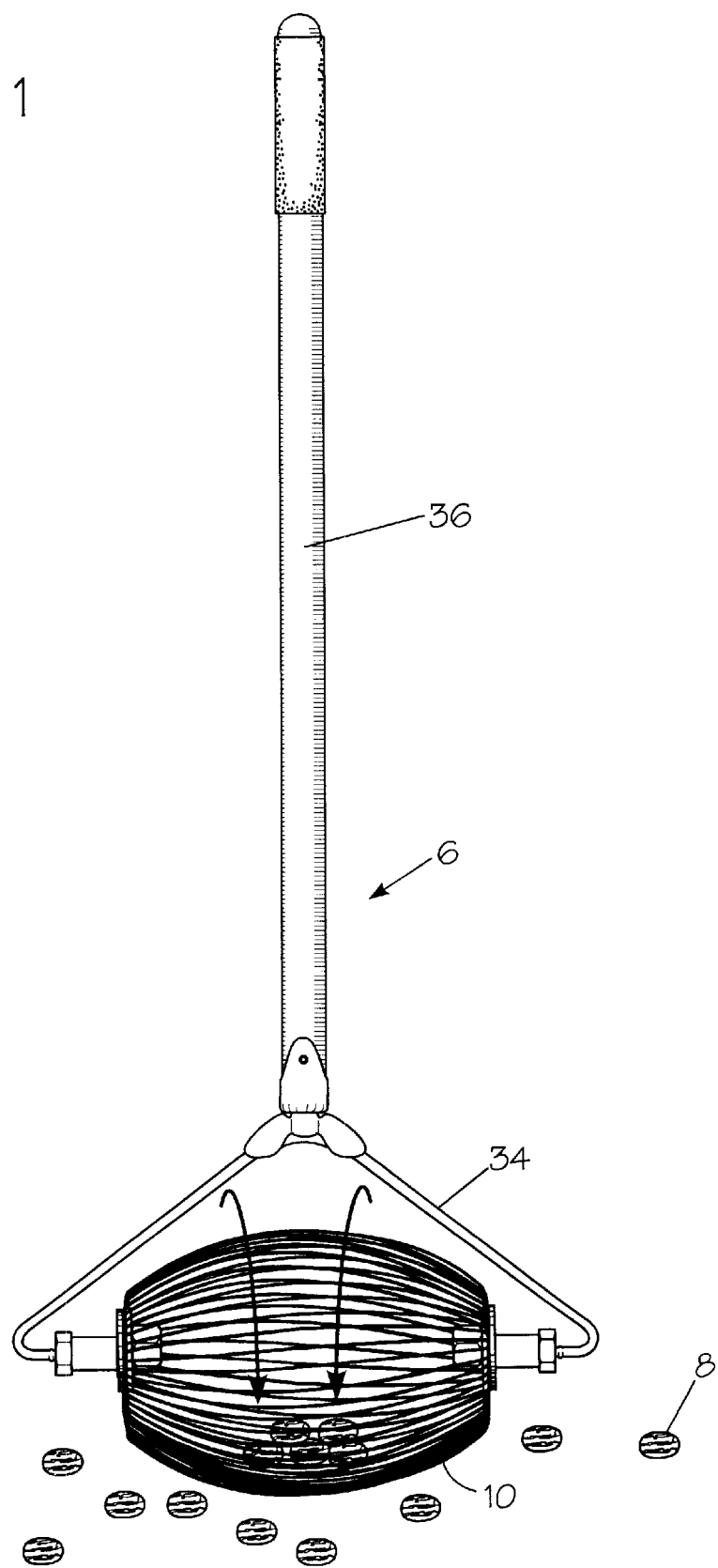
FIG. 1 is an elevational view of the nut harvester constructed in accordance with the method of the present invention.

Referring now to the drawings, FIG. 1 shows a nut harvesting device 6 harvesting nuts 8 from the ground. The device 6 is constructed in accordance with the methods disclosed herein such that the completed device 6 includes a basket 10 comprised of plurality of wires 12. In operation, the device 6 is rolled along the ground causing the wires 12 to separate upon encountering a nut until the nut 8 enters the basket 10 and resilient wires 12 return to their normal position causing the nut 8 to be entrapped within the basket. In the preferred construction of the device 6, about two pounds of nuts 8 may be captured in the basket 10 before the basket is emptied.

Figure 2:
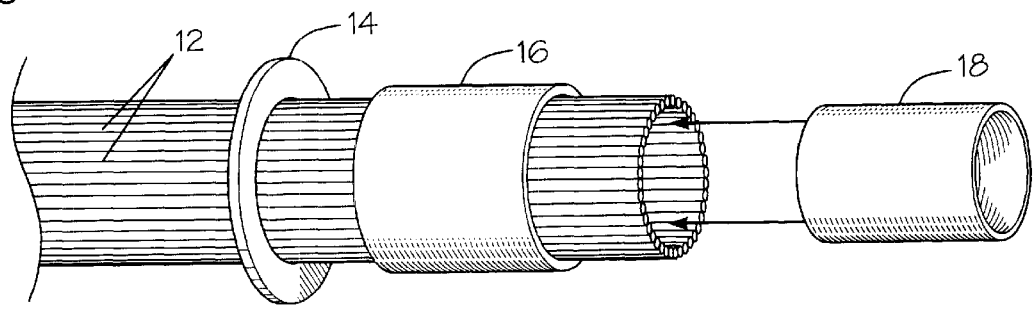
FIG. 2 is a partial perspective view of a step of the present invention in the construction of the basket of the nut harvester of FIG. 1.

The device 6 is manufactured in several steps. Referred to FIG. 2, a plurality of wires 12 of substantially equal length are provided, preferably strands of 0.041 gauge music wire may be used to provide optimum flexibility and resilience for harvesting nuts. At each end of the wires, the plurality of wires 12 are gathered in a parallel arrangement with an open ended circular configuration. On each end of the wires, a metal washer 14 having an aperture of a size to admit the plurality of wires 12 is placed over the ends of the wires. An outer sleeve 16 is provided having an aperture of a size to admit the plurality of wire 12, and the plurality of wires 12 are arranged in a circular configuration around the inner periphery of the outer sleeve 16. An inner sleeve 18 is provided that is adapted to fit inside the peripherally arranged wires 12 and has a lesser diameter than the apertures in the washers 14 and outer sleeve 16.

Figure 3A:
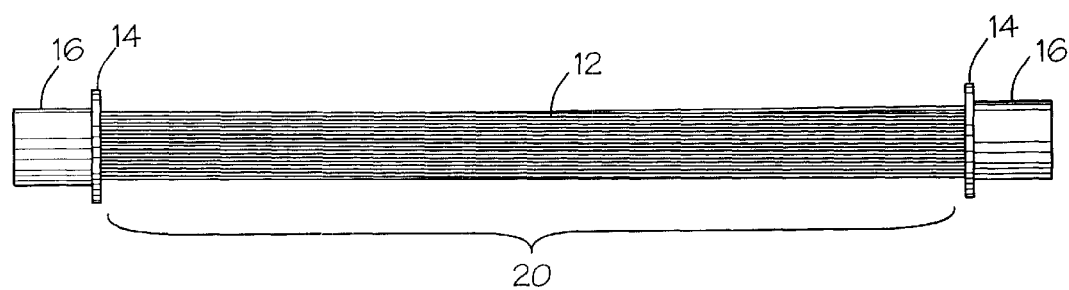
FIG. 3a is a front elevational view of a step of the present invention in the construction of the basket.
Figure 3B:
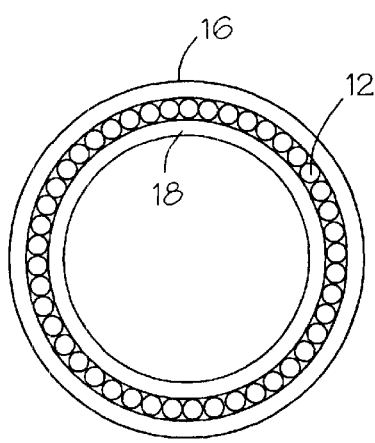

Referring to FIGS. 3a and 3b, the inner sleeves 18 are pressed into the peripherally arranged wires 12, and the wires are impinged between the outer sleeves 16 and inner sleeves 18 at each end of the wires, allowing limited individual rotation of each wire within the sleeves. As inner sleeves 18 are pressed into the peripherally arranged wires 12 and outer sleeve 16, the friction between the wires 12 and sleeves 16 and 18 causes the plurality of wires to separate slightly in the center, as shown in FIG. 3a, forming a chamber 20.

Figure 4:
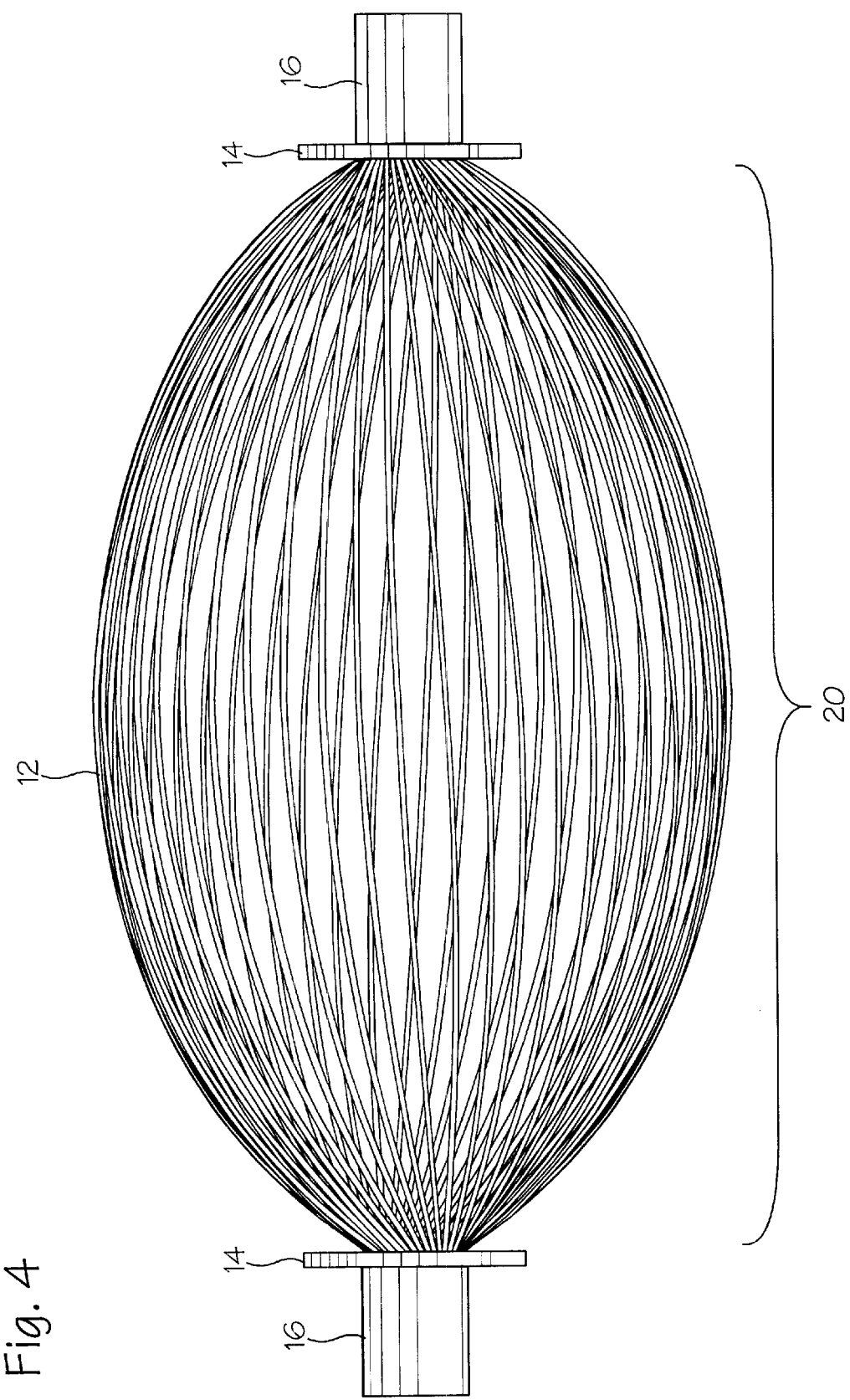
FIG. 4 is a front elevational view of a step of the present invention in the construction of the basket.
Figure 5:
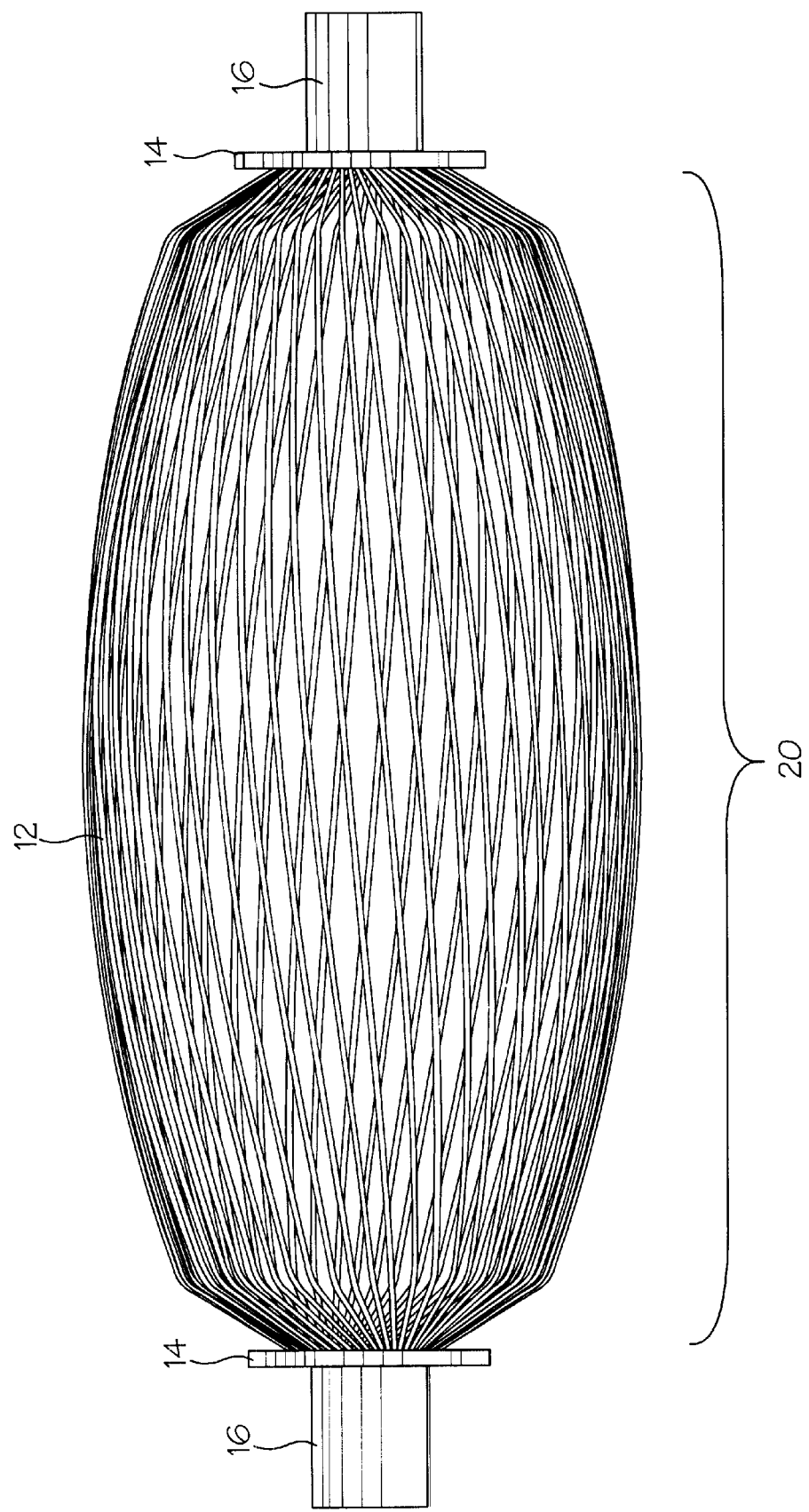
FIG. 5 is a front elevational view of a step of the present invention in the construction of the basket.
Figure 6:
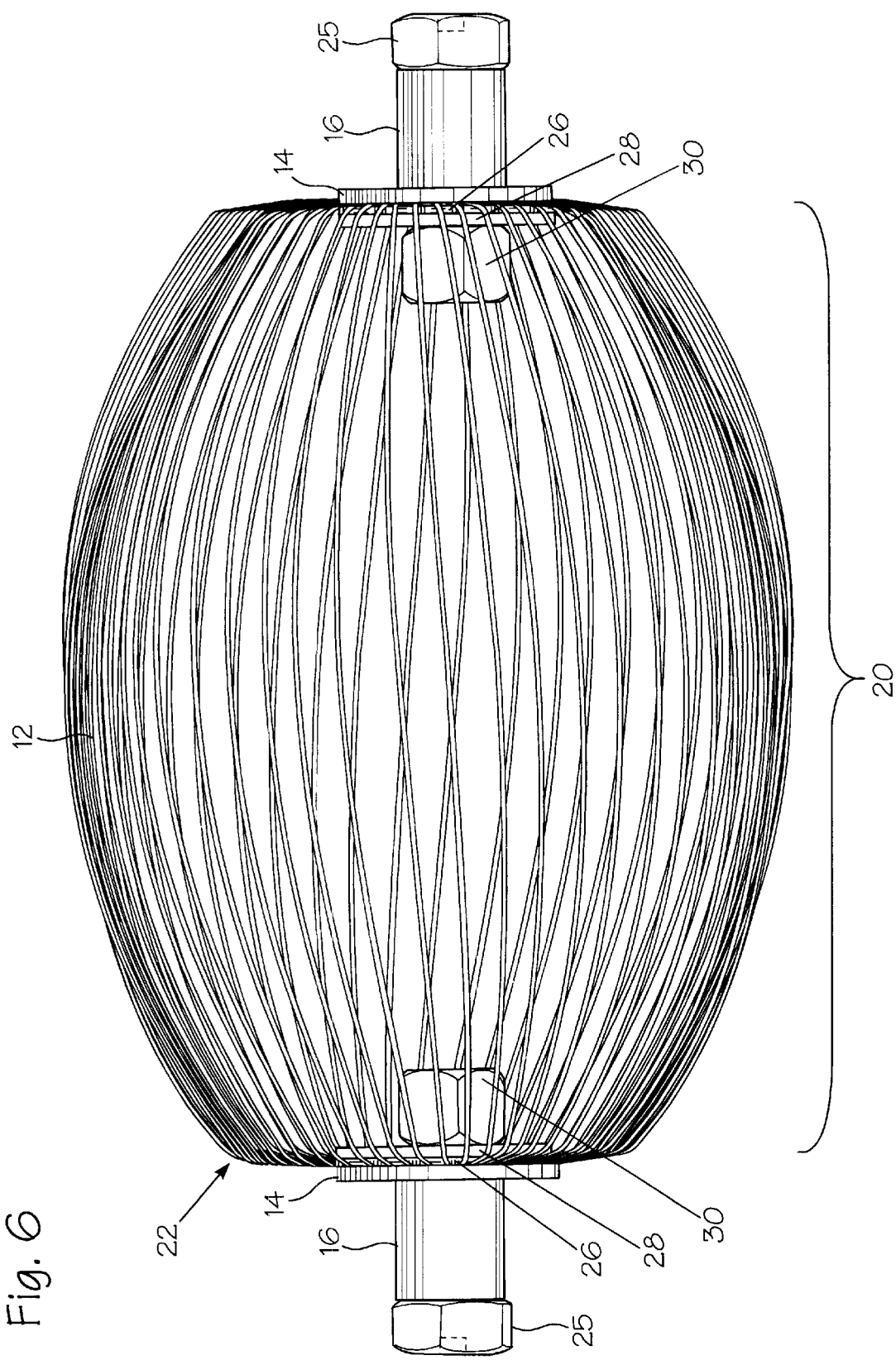
FIG. 6 is a front elevational view of the completed basket constructed in accordance with the steps of the present invention.

In the next step of manufacture shown in FIG. 4, the chamber 20 is pressed causing the chamber 20 to further enlarge into a generally oval shaped configuration. Next, as FIG. 5 illustrates, the wall of the inner chamber 20 is pressed causing deformations 22 in the wires 12 near the ends of the chamber 20. The deformations are equally spaced from the washers 14 near each end of the wires 12 of chamber 20. The deformations 22 allow the plurality of wires 12 to bend toward a vertical orientation near the washers 14, such that the final structure of the chamber 20 will appear as shown in FIG. 6 with the plurality of wires formed into a generally oval chamber having generally flattened ends.

After the deformations 22 are pressed into the wires 12, bolts 24 are inserted through the inner sleeves 18 as shown in FIG. 7, and the heads 25 of the bolts bear against the outer and inner sleeves 16 and 18. Rubber washers 26 are disposed on the bolts 24 and against the inside of the ends of the chamber 20. Metal washers 28 are disposed on the bolts 24 against the rubber washers 26, such that both the metal washers 28 and rubber washers 26 are inner washers within the chamber 20. Hex nuts 30 are threaded on the ends of bolts 24, whereby the nuts 30 are tightened on the bolts 24. As the nuts 30 are tightened on the bolts 24, the ends of the wires 12 are clamped tightly between the inner washers 26 and 28 and the outer washers 14, thereby deforming the wires 12 further and thus causing the ends of the chamber 20 to flatten and bowing the center portion of the chamber 20 into a larger generally oval shaped configuration.

A small hole 32 is drilled into the head of each bolt 24 for receiving a bail 34. A wood or plastic handle 36 is attached to bail 34 by means of a wing nut 38 welded to said bail. A threaded bolt 40 inserted through the wing nut 38 tightens into a threaded sleeve 42 of the handle 36. Thereby, the bail 34 retains the basket 10 and allows the basket to roll as the device 6 is operated by the handle 36 to harvest nuts 8 as depicted in FIG. 1.

I claim:

1. A method of manufacturing a nut harvesting device comprising the steps of:
   a. providing a plurality of wires of substantially equally length;
   b. arranging the wires substantially parallel and said wires having a pair of ends
   c. forming the ends of said wires into an open ended circular configuration having an outer periphery, and an inner periphery;
   d. inserting a washer on each end of the wires about the outer periphery of said wires;
   e. inserting an outer sleeve on each end of the wires about the outer periphery of said wires;
   f. inserting an inner sleeve on each end of the wires within the inner periphery of said wires by pressing said inner sleeve into the inner periphery of said wires causing said inner sleeve and outer sleeve to impinge against said wires to form a chamber;
   g. pressing said wires to expand said chamber;
   h. pressing said wires to form deformations near each end of said wires;
   i. inserting a bolt having a head and a threaded end through each of said inner sleeves and having the head of said bolt bear against the outer sleeve and inner sleeve and the threaded end of said bolt exposed within said chamber;
   j. placing a threaded nut on each of said threaded ends of said bolts, then tightening the nuts onto said bolts and deforming said wires to form substantially flat ends of said chamber between the nuts and inner sleeves and outer sleeves;
   k. attaching a bail to said bolts;
   attaching a handle to said bail.

2. A method of manufacturing a nut harvesting device as claimed in claim 1 further comprising the following steps after the step of inserting a bolt having a head and a threaded end through each of said inner sleeves:
   a. placing a rubber washer on each of said threaded ends of said bolts and having said rubber washer bear against said wires;
   b. placing a metal washer on each of said threaded ends of said bolts and having said metal washers bear against said rubber washers.

3. A method of manufacturing a nut harvesting device as claimed in claim 1 in which the step of attaching said bail to said bolts and said handle includes the steps of:
   a. providing a small hole in each of the heads of said bolts for receiving said bail;
   b. attaching a wing nut to said bail;
   c. placing a bolt through said wing nut to attach said bail to said handle.

* * * * *